United States Patent
Basham

[11] 3,968,589
[45] July 13, 1976

[54] PRELOADED DISPOSABLE BUTTON BAIT DEVICE

[75] Inventor: Monte C. Basham, Apple Valley, Calif.

[73] Assignee: The Raymond Lee Organization, Inc., New York, N.Y.; a part interest

[22] Filed: Mar. 31, 1975

[21] Appl. No.: 563,625

[52] U.S. Cl. .................................. 43/81; 43/96
[51] Int. Cl.² ................................... A01M 23/24
[58] Field of Search .......... 43/81, 96, 81.5, 82, 43/83, 83.5, 88, 92

[56] References Cited
UNITED STATES PATENTS

| 1,464,559 | 8/1923 | Britan | 43/81 |
| 2,190,089 | 2/1940 | Sund | 43/81 |

*Primary Examiner*—Warner H. Camp
*Attorney, Agent, or Firm*—Daniel Jay Tick

[57] ABSTRACT

An open container of mouse bait has a bottom and an open top. A pair of arms are affixed to and extend parallel to the bottom of the container in spaced relation therewith whereby the container is removably mounted on the trigger device of a mousetrap and maintained thereon via such arms.

2 Claims, 2 Drawing Figures

U.S. Patent  July 13, 1976  3,968,589

PRELOADED DISPOSABLE BUTTON BAIT DEVICE

DESCRIPTION OF THE INVENTION

The present invention relates to a mousetrap bait device. More particularly, the invention relates to a mousetrap bait device for a mousetrap having a trigger device for springing the trap.

Objects of the invention are to provide a mousetrap bait device of simple structure, which is inexpensive in manufacture, and functions efficiently, effectively and reliably to lure a mouse to a mousetrap and prevent it from taking the bait without springing the trap.

Figure 1:
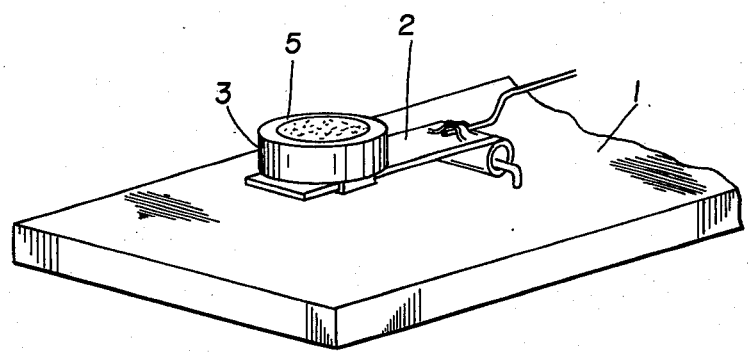
Figure 2:
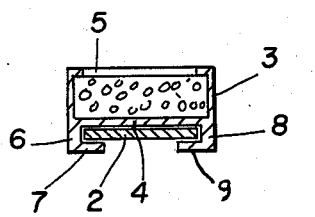

In order that the invention may be readily carried into effect, it will now be described with reference to the accompanying drawing, wherein:

FIG. 1 is a perspective view of an embodiment of the mousetrap bait device of the invention; and FIG. 2 is a cross-sectional view of the embodiment of FIG. 1.

In the FIGS., the same components are identified by the same reference numerals.

The mousetrap bait device of the invention is for a mousetrap 1 having a trigger device 2 for springing the trap. The mousetrap bait device of the invention comprises an open container 3 of cylindrical or any suitable configuration having a bottom 4 and an open top 5.

A pair of arms are affixed to and extend substantially parallel to the bottom 4 of the container 3 in spaced relation therewith whereby the container is removably mounted on the trigger device 2 and maintained thereon via the arms. Thus, as shown in FIG. 2, each of the arms comprises a substantially L-type member.

One of the arms has a first part 6 affixed to the container 3 and extending substantially perpendicularly from the bottom 4 and a second part 7 extending substantially perpendicularly from the first part 6 substantially parallel to the bottom in spaced relation therewith.

The other of the arms has a first part 8 affixed to the container 3 and extending substantially perpendicularly from the bottom 4 and a second part 9 extending substantially perpendicularly from the first part 8 substantially parallel to the bottom in spaced relation therewith. The second part 7 and 9, respectively, of each arm extends toward the second part of the other.

The container 3 is slid onto the trigger device 2 and is slid off said trigger device after the container has been emptied.

While the invention has been described by means of a specific example and in a specific embodiment, I do not wish to be limited thereto, for obvious modifications will occur to those skilled in the art without departing from the spirit and scope of the invention.

I claim:

1. A preloaded disposable button bait device for a trap having a trigger device for springing the trap, said bait device comprising
   an open substantially cylindrical container of bait having a substantially circular bottom and an open top, said container being preloaded with animal bait; and
   a pair of arms affixed to and extending substantially parallel to the bottom of the container in diametrically opposed spaced relation therewith whereby the container is removably mounted on the trigger device of a trap and maintained thereon via said arms.

2. A preloaded disposable button bait device as claimed in claim 1, wherein each of the arms comprises a substantially L-type member having a first part affixed to the container and extending substantially perpendicularly from the bottom and a second part extending substantially perpendicularly from the first part substantially parallel to the bottom in spaced relation therewith, the second part of each arm extending toward the second part of the other.

* * * * *